United States Patent [19]

Hermans

[11] 4,048,106

[45] Sept. 13, 1977

[54] NOVEL POLYUREAS PREPARED BY REACTION OF A DIAMINE WITH A DIISOCYANATE OR A DIISOTHIOCYANATE

[75] Inventor: Johny C. Hermans, Wespelaar, Belgium

[73] Assignee: s.a. Texaco Belgium n.v., Brussels, Belgium

[21] Appl. No.: 628,263

[22] Filed: Nov. 3, 1975

[30] Foreign Application Priority Data

May 21, 1975  United Kingdom ............... 21772/75

[51] Int. Cl.$^2$ .................... C08G 18/14; C08G 18/32; C08G 18/38
[52] U.S. Cl. .................... 260/2.5 AV; 260/77.5 CH; 260/268 K; 260/268 MK; 260/294.8 R; 544/69; 544/114; 544/120
[58] Field of Search .................. 260/77.5 CH, 2.5 AV

[56] References Cited

U.S. PATENT DOCUMENTS

| | | | |
|---|---|---|---|
| 2,975,157 | 3/1961 | Katz | 260/77.5 CH |
| 3,245,961 | 4/1966 | Fetscher et al. | 260/77.5 CH |
| 3,298,937 | 1/1967 | Strauss et al. | 204/44 |
| 3,355,437 | 11/1967 | Tesoro et al. | 260/77.5 CH |
| 3,384,611 | 5/1968 | Grushkin | 260/77.5 CH |
| 3,450,677 | 6/1969 | McConnell et al. | 260/77.5 CH |
| 3,531,550 | 9/1970 | Herber et al. | 260/959 |
| 3,583,946 | 6/1971 | Dobinson | 260/77.5 CH |
| 3,948,820 | 4/1976 | Reynard et al. | 260/77.5 CH |

*Primary Examiner*—H.S. Cockeram
*Attorney, Agent, or Firm*—Thomas H. Whaley; Carl G. Ries; Carl G. Seutter

[57] ABSTRACT

Polyureas containing phosphorus are prepared by the reaction of a diisocyanate or a diisothiocyanate with a diamine. In a typical reaction, phenyl bispiperazidophosphate is reacted with tolylene -2,4-diisocyanate to yield a polyurea product which may be cast into a non-burning, flexible film.

13 Claims, No Drawings

NOVEL POLYUREAS PREPARED BY REACTION OF A DIAMINE WITH A DIISOCYANATE OR A DIISOTHIOCYANATE

BACKGROUND OF THE INVENTION

This invention relates to novel polymers and to a process for the preparation thereof. These polymers are polyureas which contain phosphorus atoms as part of the main polymer chain. This invention also relates to shaped articles formed from these polymers.

It is known that polyureas can be prepared by the reaction of diisocyanates with diamines according to the following scheme

Polyureas produced by such processes find a variety of uses, for instance as lacquers and as moulding compositions. There has, however, been a continuing search for new polyureas with new and advantageous properties.

The object of the present invention is to provide novel polyureas. Another object of the present invention is to provide polyureas having non-flammable or flame-resistant properties.

STATEMENT OF THE INVENTION

The present invention provides polyureas containing repeating groups of the formula

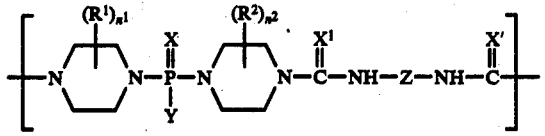

I

X is absent or represents an oxygen or sulphur atom or a group of the formula = N—R in which R represents an aliphatic, cycloaliphatic or aromatic group or a heterocyclic group;

X' represents an oxygen or sulphur atom;

Y represents an aliphatic, cycloaliphatic or aromatic hydrocarbon group or heterocyclic group, a group of the formula —NR$_2$ wherein R has the meaning given above or wherein the two groups R and the nitrogen atom to which they are attached together represent a N-containing heterocyclic ring; a group of the formula —OR in which R has the meaning given above; or a group of the formula

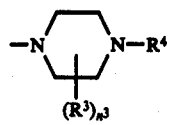

II

R$^1$, R$^2$, R$^3$ and R$^4$ each represents a substituent on the piperazine ring, n$^1$, n$^2$ and n$^3$, which may be the same or different each represents O or an integer; and Z represents the residue obtained by removal of the NCO or NCS groups from an organic diisocyanate or diisothiocyanate.

The present invention also provides a process for preparing such polymers which comprises reacting a diisocyanate or diisothiocyanate of the formula

III and a diamine of the formula

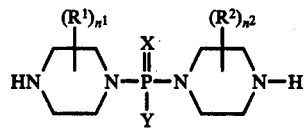

IV in which formulae X, X', Y, Z, R$^1$, R$^2$, n$^1$ and n$^2$ have the meanings given above.

DESCRIPTION OF THE INVENTION

The diisocyanate or diisothiocyanate component may be a single compound, or it may be a mixture of two or more diisocyanates or diisothiocyanates. Similarly a single phosphorus-containing amine of the formula given above, or a mixture of such amines, can be employed.

In the present invention, the symbol X can be absent or can represent oxygen or sulphur, or it can represent a group of the formula = N—R, the diamines being derived, respectively from phosphorus phosphoric, thiophosphoric and phosphorimidic acids.

The symbol X' can represent an oxygen or sulphur atom, in which case the reactants of formula III are respectively, diisocyanates and diisothiocyanates.

The symbol Y can represent a group of the formula:

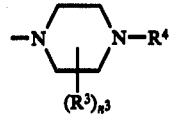

II in which case, the compounds used in the process according to the invention are trispiperazides. When Y has one of its other meanings, the compounds are bispiperazides. Y can for example represent a substituted or unsubstituted hydrocarbon group which can be of aliphatic, cycloaliphatic or aromatic nature. Examples of suitable aliphatic groups are alkyl, such as methyl, ethyl, propyl, butyl, octyl, dodecyl, or octadecyl; alkenyl, such as allyl; or alkynyl, such as propargyl.

Examples of suitable cycloaliphatic groups are cycloalkyl, such as cyclohexyl, tetrahydronaphthyl or decahydronaphthyl; and cycloalkenyl, such as cyclohexenyl.

Examples of suitable aromatic hydrocarbon groups are aryl groups, such as phenyl, naphthyl, biphenyl, or phenanthryl; aralkyl, such as benzyl, or phenylethyl; and alkaryl, such as tolyl, dimethylphenyl, trimethylphenyl, cumyl, or p-octylphenyl.

Y can alternatively represent a heterocyclic group, linked to the phosphorus atom through a carbon atom, as in the tetrahydrofurfuryl or 2-pyridyl radicals.

Y can also represent a group of the formula —NR$_2$, in which each R represents an aliphatic, cycloaliphatic, or aromatic hydrocarbon group or a heterocyclic group. Examples of these hydrocarbon groups or heterocyclic groups are given above. Specific examples of suitable amino radicals are dimethylamino, diethylamino, dipropylamino, dibutylamino, N-methylanilino, and N-butylanilino.

Alternatively, both symbols R, and the nitrogen atom to which they are attached, can together represent a heterocyclic radical linked to the phosphorus atom through the nitrogen atom. Examples of such groups are morpholino, piperidino, tetrahydroquinolino, pyrrolidino etc. The compounds in which Y represents a further piperazino group are, of course, a special instance of this.

Y can also represent a group of the formula —OR in which R has the meaning given above. Examples of such groups are alkoxy, such as methoxy, ethoxy, propoxy, butoxy, dodecyloxy and octadecyloxy; and aryloxy such as phenoxy, tolyloxy, or benzyloxy.

Any of the above radicals can if desired, be substituted. The only limitation upon the nature of the substituents is that they should be inert with respect to isocyanate or isothiocyanate groups.

In the groups of the formula:

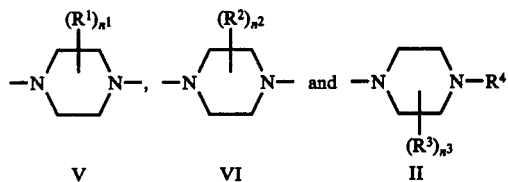

$R^1$, $R^2$ and $R^3$, which may be the same or different represent substituents on the piperazine ring. Here again, the only limitation upon the nature of the substituent is that it should be inert towards isocyanate or isothiocyanate groups, i.e. it should contain no active hydrogen atoms. The substituent can, for example, be one of the groups set out above for Y, provided that such a group containing no active hydrogen atoms. When present, it can for example be an alkyl group, such as a methyl group. Alternatively, the substituent can have a meaning not set out above, insofar as it might not be an appropriate group for attachment to phosphorus; for example, an oxo group. Specific examples of substituted piperazine groups are 2,5-dimethylpiperazino and 2,5-dioxopiperazino groups, $n^1$, $n^2$ and $n^3$ which can be the same or different, each represents 0 or an integer, preferably 0, 1 or 2: $R^4$ can represent a hydrogen atom (in which case the products of reaction will be cross-linked), or a substituted or unsubstituted aliphatic, cycloaliphatic or aromatic hydrocarbon group or a heterocyclic group. Examples of suitable groups are set out above. Specifically preferred groups $R^4$ include alkyl, such as methyl, ethyl, phenyl, and substituted groups such as β-cyanoethyl and β-carbethoxyethyl. $R^4$ can also represent an acyl group, e.g. of an aliphatic, cycloaliphatic, aromatic or heterocyclic carboxylic acid, such as acetic, propionic, butyric or stearic acid, cyclohexane carboxylic acid, benzoic acid, toluic acid, nicotinic acid or a methylnicotinic acid. Alternatively $R^4$ can represent a sulphonyl group, for example a methane sulphonyl, benzene sulphonyl or toluene sulphonyl group. $R^4$ can also represent a substituted carbamoyl group —CO—NHR wherein R has the meaning given above. An example of such a grop is phenylcarbamoyl.

These piperazide compounds are described in our copending application Ser. No. 628,288 filed Nov. 3, 1975 by the instant inventor.

They can readily be prepared by reacting a compound of the formula

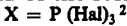

or

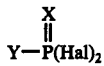

in which X and Y have the meanings given above and Hal represents chlorine or bromine, with a piperazine derivative of the formula

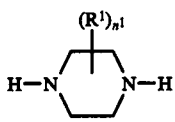

in which $R^1$ and $n$ have the meanings given above. This reaction can conveniently be carried out in an inert solvent, e.g. benzene, toluene or xylene at an elevated temperature, e.g. 60° to 80° C.

In the diisocyanates and diisothiocyanates of the formula $$X'CN—Z—NCX' \qquad III$$

Z can represent a divalent aliphatic radical, for instance a methylene or polymethylene group of the formula $(—CH_2—)_m$, wherein $m$ is an integer. Examples of isocyanates containing such groups are methylene, ethylene, n-propylene, n-butylene, pentamethylene, hexamethylene, and octamethylene diisocyanate.

Alternatively Z can represent a non-linear saturated aliphatic radical, such as ethylidene or isopropylidene, or a cycloaliphatic radical, e.g. 1,4-cyclohexylene.

Z can alternatively represent an unsaturated aliphatic group, for example an alkenyl or alkynyl group, e.g. but-2-enylene or but-2-ynylene.

Z can also represent an arylene or substituted arylene, alkarylene or aralkylene radical. Examples of isocyanates containing such radicals include tolyene-2,4-diisocyanate, tolylene-2,6-diisocyanate, mixtures of tolyene-2,4- and -2,6-diisocyanates, naphthylene-1,5-diisocyanate, phenylene-1,4-diisocyanate, 4-isocyanatobenzyl isocyanate, and 1,4-diisocyanatomethyl benzene.

Z can also represent two or more arylene rings, linked directly or through oxygen or sulphur atoms, azo groups, substituted amino groups or hydrocarbon, sulphoxide, sulphone groups, or groups of the formula

in which X and Y have the meanings given above. Examples of such groups include diphenylene-4,4'-diisocyanate, diphenyl ether-4,4'-diisocyanate, diphenyl- sulphide 4,4'-diisocyanate, azobenzene-4,4'-diisocyanate, diphenylmethylamine-4,4'-diisocyanate, diphenylsulphoxide-4,4'-diisocyanate, diphenylsulphone-4,4'-diisocyanate, triphenyl phosphine oxide -4,4'-diisocyanate. diphenylmethane-4,4'-diisocyanate, and 2,2-diphenylpropane-4,4'-diisocyanate.

Z can also represent a heterocyclic group, e.g. in piperazine-N,N'-diisocyanate, or substituted derivatives thereof, e.g. 2,4-dimethylpiperazine-N,N'-diisocyanate.

A further possibility is that Z can represent a group containing a hetero atom, such as a phosphorus, sulphur or silicon atom, e.g. in isocyanates of dialkyl ethers, such as ω,ω'-diisopropyl ether diisocyanate, or in diisocyanates of the formula

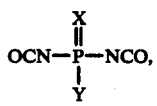

$OCN-SO_2-NCO$, or $OCN-SiR_2-NCO$, in which R, X and Y have the meanings given above.

Alternatively to the various diisocyanates mentioned above, the corresponding diisothiocyanates can be employed.

Instead of the diisocyanates or diisothiocyanates, it is also possible to use the so-called masked or blocked isocyanates. These are compounds in which one or both of the NCO groups have been converted into carbamic acid ester groups by reaction with an alcohol of the formula ROH. Examples of such masked isocyanates are dimethoxycarbonyl hexamethylenediamine, N,N'-diphenoxycarbonyl trimethylenediamine or N,N'-dicyclohexyloxycarbonyldecamethylene diamine, an aromatic diamine derivative such as N,N'-dimethoxycarbonyl benzidine, N,N'-dimethoxycarbonyl diaminodiphenylsulphone, N,N'-dimethoxycarbonyl-4,4'-diaminodiphenylmethane and N,N'-diethoxycarbonyl-1,5-diaminonaphthalene, an alicyclic diamine derivative such as N,N'-diethoxycarbonyl-1,4-cyclohexyldiamine, and N,N'-diphenoxycarbonylcyclopentane-1,3-diamine and a compound of any of the following formulae:

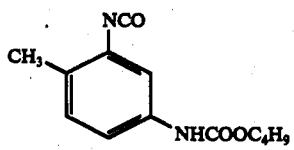 VII

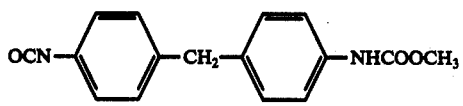 VIII

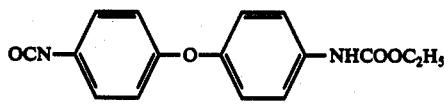 IX

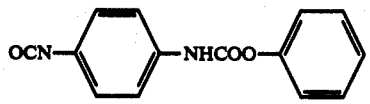 X

As indicated above, mixtures of diisocyanates and/or mixtures of diamines can be employed. It is also possible to provide cross-linked polyureas by employing in the reaction, a minor amount of a trifunctional reactant or reactants. In this way branched rather than linear products are obtained. The quantity of trifunctional reactant that is to be employed is selected as desired to produce a suitable degree of cross-linking, the extent of which will be governed in known manner, by the properties desired for the cross-linked product.

Examples of suitable trifunctional reactants which can be employed as cross-linking agents include triamines, such as phosphoric trispiperazide

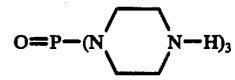 XI disclosed in our co-pending application Ser. No. 628,288 filed Nov. 3, 1975 by the instant inventor or related compounds, or other triamines, for example melamine. Alternatively it is possible to use triisocyanates, e.g. benzene-1,3,5-triisocyanate, toluene-2,4,6-triisocyanate, triphenylmethane-4,4',4''-triisocyanate, the reaction product of 1 mole of trimethylol propane and 3 moles of tolylene-2,4-diisocyanate, having the formula

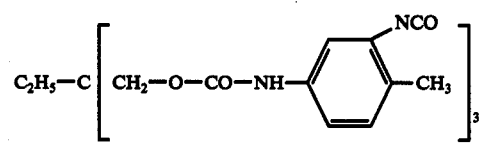 XII

The polyurea-forming reaction will most advantageously be carried out under anhydrous conditions and in an atmosphere of an inert gas, such as nitrogen. The reaction can be carried out in bulk, or it can be carried out in solution in an inert solvent. Inert solvents are those which do not contain any active hydrogen atoms, or groups which will react with any substituents on the amine reactant. Examples of suitable solvents include such aprotic organic solvents as chloroform, dimethyl acetamide, dimethyl formamide (DMF), diethyl formamide, N-methyl-2-pyrrolidone (NMP), N-methylcaprolactam, dimethyl sulphoxide (DMSO) and pyridine. These solvents may be used by themselves or in combination with such solvents as benzene, toluene, nitrobenzene, chlorobenzene, dioxane or cyclohexane.

The reaction can be left to proceed spontaneously or, if desired, can be accelerated by gentle heating, for instance at a temperature of from 60° to 150° C. If desired, a catalyst such as a tertiary amine, e.g. triethylamine can be included in the reaction mixture.

Polyurea foams can be prepared by carrying out the reaction in the presence of a blowing agent, e.g. carbon dioxide (which may optionally be generated in situ by allowing a portion of the isocyanate to react with an acid) or a low boiling solvent, such as a chlorofluoroalkane.

Generally, substantially stoichiometric equivalents of the diisocyanate and of the diamine will be employed, but slight deviations from exact stoichiometric equivalence, for example up to 1.1 mole of either reactant, are permissible.

A standard technique which can be employed for the preparation of polyureas, is as follows:

A solution of 0.005 mole of the bispiperazidophosphorus compound (IV) in 25 ml of dimethyl formamide (DMF) was placed in an Erlenmeyer flask provided with an inlet for dry nitrogen, and with a dropping funnel with a side tube and closed with a calcium chloride tube. At room temperature and with gentle stirring, a solution of 0.005 mole of the diisocyanate (III) in 25 ml of DMF was added in one portion from the dropping funnel to the Erlenmeyer flask, and stirring was continued for 10 to 30 minutes. If a precipitate was formed, the mixture was warmed until the precipitated polyurea had dissolved, generally from 60 to 150° C. for 30 to 60 minutes, under stirring. The DMF-solution was concentrated under reduced pressure (1 to 20 mm Hg) to about 30 ml, filtered to remove insoluble particles — the solution was filtered hot if necessary to avoid precipitation — and the polyurea was isolated by precipitation of this cooled solution in 600 to 800 ml of acetone. The polyurea was filtered off, washed with acetone and dried in vacuum at 50°-70° C. over phosphorus pentoxide.

The polyureas so obtained were white powders which were very slightly hygroscopic.

DMF was found to be a very suitable solvent for the polyaddition reactions, because both reactants, as well as the polyurea, were soluble in it. Other solvents can also be used, for example chloroform, in which only the two reactants are soluble, but not the polyurea.

Table 1 below lists some polyureas prepared by the standard procedure and some of their physical properties. The polyureas were obtained in yields of from 80 to 95% and had low to moderate molecular weights, as in indicated by the range of their intrinsic viscosity (from 0.085 to 0.80 dl/g measured in DMF at 25° C.). The melt temperatures of the polyureas were in the range from 210° to 250° C., and their decomposition temperatures were from 260° to 290° C., but foam formation (decomposition) occurred with some polyureas already at the melt temperature. The melt and decomposition temperatures were determined by heating the polymer powder in a melting point capillary at about 8° C/min.

The polyureas exhibit good solubility in dimethylformamide (DMF) and in dimethylsulfoxide (DMSO), but not in chloroform, benzene, alcohols, petroleum ether, base oils (SNO-20 and 145-PPT). Films were cast on a glass plate from DMF solutions of the polyureas. Several polyureas formed films with a good general appearance, but the polymers with a low molecular weight ([$\eta$]≦0.15 dl/g), form brittle films which exhibit scaling. The good films were in general colourless and flexible and showed a strongly reduced inflammability or they were nonburning. The films were stable against ageing, remaining unchanged when kept for seven months in daylight in air.

It is also possible to form shaped articles from the polyureas, as by carrying out the reaction between the isocyanate and piperazide in a mould, optionally in the presence of a blowing agent to give a foamed shaped article.

TABLE I
POLYUREAS

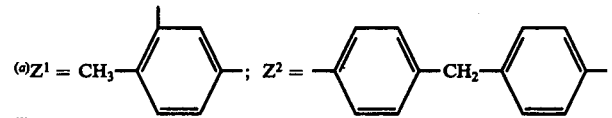

| No. | Polyurea X | Y | Z$^{(a)}$ | Yield % | Intrinsic visc. [$\eta$] in dl/g (DMF; 25° C.) | Melt. temp. (° C) | Decomp. temp. (° C) |
|---|---|---|---|---|---|---|---|
| IV | O | O—C$_2$H$_5$ | Z$^1$ | 91.6 | 0.136 | 210-230 | 250-260 |
| V | O | O—C$_6$H$_5$ | Z$^1$ | 93.8$^{(b)}$ | 0.297 | 240-250 | 280-290 |
|   |   |   |   | 95.6$^{(c)}$ | 0.204 | 240-255 | 280-285 |
| VI | O | N—(C$_3$H$_7$)$_2$ | Z$^1$ | 90.7 | 0.084 | 215-225 | 240-250 |
| VII | S | O—C$_2$H$_5$ | Z$^1$ | 92.7 | 0.085 | 200-220 | 240-260 |
| VIII | S | O—C$_6$H$_5$ | Z$^1$ | 94 | 0.310 | 225-250 | 275-290 |
| IX | O | O—C$_2$H$_5$ | Z$^2$ | 94.4 | 0.226 | 225-230 | 260-270 |
| X | O | O—C$_6$H$_5$ | Z$^2$ | 88.5 | 0.505 | 235-255 | 285-300 |
| XI | O | N—(C$_3$H$_7$)$_2$ | Z$^2$ | 91.5 | 0.15 | 230-245 | 255-270 |
| XII | S | O—C$_2$H$_5$ | Z$^2$ | 92 | 0.15 | 215-225 | 240-255 |
| XIII | S | O—C$_6$H$_5$ | Z$^2$ | 79.5 | 0.80 | 225-245 | 265-290 |

$^{(a)}$Z$^1$ = CH$_3$—⌬— ; Z$^2$ = —⌬—CH$_2$—⌬—
$^{(b)}$Run made in chloroform as solvent
$^{(c)}$Run made in DMF The hydrolytic stability of two polyureas, VIII and XIII; was checked against 10N and 1 N sulfuric acid and 10N NaOH and 0.1 N KOH. The polymer films were quite stable against the acidic and caustic solutions. In all the tests, the general appearance of the films remained unchanged after 3 days immersion at room temperature. The films showed an increase of weight due to solvent uptake; when the strips were accordingly dried for 3 days at room temperature in air, the weight had decreased to slightly below the starting weight of the film strips.

Practice of the process of this invention will be apparent to those skilled in the art from the following illustrative examples.

DESCRIPTION OF SPECIFIC EMBODIMENTS

EXAMPLE 1

Preparation of polyurea V

To 0.005 mole (1.552 g) of phenyl bispiperazidophosphate dissolved in 25 ml chloroform was added in a nitrogen atmosphere at room temperature with stirring, 0.005 mole (0.871 l g) of tolylene-2,4-diisocyanate dissolved in 25 ml of chloroform. Immediately a precipitate was formed. The mixture was stirred for 20 minutes and kept overnight. Chloroform was stripped off and the residue was dissolved in 30 ml of DMF, and filtered through a glass filter, and the polyurea was precipitated by adding the solution to 400 ml of acetone, filtered off and dried. Yield: 2.275 g (93.8%) [$\eta$] = 0.297 dl/g (DMF, 25° C), melting temperature 240°-250° C., decomposition temperature 280°-290° C.

The polyurea formed, on casting from a DMF solution, a colourless, flexible film with a good appearance, which was nonburning.

EXAMPLE 2

Preparation of polyurea VIII

To 0.005 mole (1.632 g) of phenyl bispiperazidothiophosphate dissolved in 25 ml of DMF was added at room temperature, under nitrogen and with stirring, a solution of 0.005 mole (0.714 ml) of tolylene-2,4-diisocyanate in 25 ml of DMF and the mixture was stirred for 1.5 hours. The polyurea formed remained in solution. To isolate the polyurea, the mixture was concentrated to about 30 ml under reduced pressure (20 mm) at 80° to 100° C. filtered through a glass filter and precipitated in 800 ml of acetone. The white powder obtained was filtered off and dried. Yield: 2,357 g (94%). [η] = 0.310 dl/g (DMF ; 25° C); melting temperature 225°-250° C; decomposition temperature 275°-290° C.

The polymer was cast from a DMF solution into a film with good general appearance, which was slightly hazy and flexible and which was self-extinguishing.

EXAMPLE 3

Preparation of polyurea XI

To 0.005 mole (1.587 g) of phosphoric dipropylamido bispiperazide dissolved in 25 ml of DMF was added at room temperature, in a nitrogen atmosphere and with stirring, 0.005 mole (1.251 g) of diphenyl methane-4,4'-diisocyanate dissolved in 25 ml of DMF. At room temperature, a gel-like precipitate was formed, which dissolved when the mixture was warmed to 60° C. with stirring. The mixture was concentrated to about 35 ml, filtered warm, and precipitated in 500 ml of acetone. The polyurea was filtered off and dried. Yield: 2.599 g (91.5%). [η] = 0.15 dl/g (DMF ; 25° C). The melting temperature was 230°-245° C. and the decomposition temperature was 255°-270° C.

A colourless, flexible film was cast from a DMF solution. It had a good general appearance and was self-extinguishing.

EXAMPLE 4

Preparation of polyurea XII

To 0.005 mole (1.392 g) of ethyl bispiperazidothiophosphate dissolved in 25 ml of DMF was added, at room temperature under nitrogen and with stirring, 0.005 mole (1.251 g) of diphenylmethane-4,4'-diisocyanate. The mixture was stirred for 1 hour at room temperature, slightly concentrated (under vacuum) and precipitated in 700 ml of diethyl ether. The polymer was filtered off and dried. Yield: 2,457 g (92%) ; [η] = 0.15 dl/g (DMF ; 25° C); melting temperature 215°-225° C.; decomposition temperature 240°-250° C. This polymer formed only a very brittle film which scaled when touched.

EXAMPLE 5

Preparation of polyurea XIII

To 0.005 mole (1.632 g) of phenyl bispiperazidothiophosphate dissolved in 25 ml of DMF was added in one portion at room temperature under a nitrogen atmosphere and with stirring, a solution of 0.005 mole (1.251 g) of diphenylmethane-4,4'-diisocyanate dissolved in 25 ml of DMF, and the mixture was stirred for 1 hour. It was concentrated to about 30 ml and precipitated in 700 ml of acetone. The white powder was filtered off and dried. Yield: 2.293 g (79.54%); [η] = 0.80 dl/g (DMF : 25° C). Melting temperature 225°-245° C; decomposition temperature 265°-290° C. A film which had a good appearance, which was colourless, which was colourless, flexible and non-burning was cast from a DMF solution.

Although this invention has been illustrated by reference to specific embodiments, it will be apparent to those skilled in the art that various changes and modifications may be made which clearly fall within the scope of this invention.

What we claim is:

1. Polyureas containing repeating groups of the formula

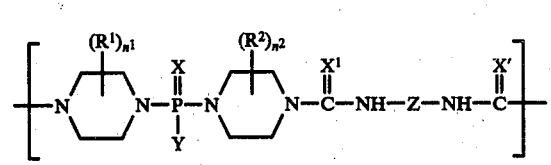

X is absent or represents an oxygen or sulphur atom or a group of the formula =N-R in which R represents an aliphatic, cycloaliphatic or aromatic group or a heterocyclic group;

X' represents an oxygen or sulphur atom;

Y represents an aliphatic, cycloaliphatic or aromatic hydrocarbon group or heterocyclic group;

a group of the formula -NR$_2$ wherein R has the meaning given above or wherein the two groups R and the nitrogen atom to which they are attached together represent a N-containing heterocyclic ring;

a group of the formula —OR in which R has the meaning given above; or a group of the formula

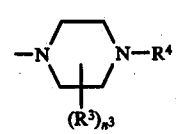

II

R$^1$, R$^2$, R$^3$ and R$^4$ each represent a substituent on the piperazine ring said substituents R$^1$, R$^2$ and R$^3$ containing no active hydrogen atoms reactive with isocyanate or isothiocyanate groups, and substituent R$^4$ being hydrogen or a substituted or unsubstituted aliphatic, cycloaliphatic or aromatic hydrocarbon group, a heterocyclic group, an acyl group, a sulphonyl group, or a substituted carbamoyl group, —CO—NHR, wherein R has the meaning give above, n$^1$, n$^2$ and n$^3$, which may be the same or different each represents O or an integer; and Z represents the residue obtained by removal of the NCO or NCS groups from an organic diisocyanate or diisothiocyanate.

2. A polyurea as claimed in claim 1, wherein Z represents a methylene or polymethylene group.

3. A polyurea as claimed in claim 1, wherein Z represents an arylene group.

4. A polyurea as claimed in claim 1, wherein Z represents two arylene rings linked directly or through an oxygen or sulphur atom, an azo group, a substituted amino group, or a hydrocarbon, sulphoxide or sulphone groups, or a group of the formula

in which X and Y have the meanings given above.

5. A polyurea as claimed in claim 1, wherein $n^1$ and $n^2$ both represent O.

6. A polyurea as claimed in claim 1, wherein Y represents a group of the formula —OR or NR$_2$ wherein R represents alkyl or aryl.

7. A process for the preparation of a polyurea as claimed in claim 1 which comprises reacting a diisocyanate or diisothiocyanate of the formula

X'CN—Z—NCX'     III with a diamine of the formula

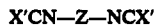      IV

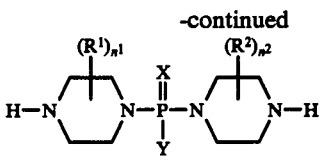

in which formulae X, X', Y, Z, R$^1$, R$^2$, $n^1$ and $n^2$ have the meanings given in claim 1.

8. A process as claimed in claim 7, wherein the diisocyanate or diisothiocyanate and/or the diamine is employed in admixture with one or more other diisocyanates or diisothiocyanates and/or amines.

9. A process as claimed in claim 7, wherein the diisocyanate is blocked by reaction with a compound of the formula ROH, in which R is an alkyl or aryl group.

10. A process as claimed in claim 7, wherein a triisocyanate or triisothiocyanate, or a triamine is employed in minor amount.

11. A process as claimed in claim 7, wherein reaction is carried out in a solvent.

12. A process as claimed in claim 7, wherein reaction is carried out in the presence of a blowing agent.

13. A process as claimed in claim 7 wherein reaction is carried out in the presence of a tertiary amine as catalyst.

* * * * *